United States Patent [19]

Gerety

[11] Patent Number: 4,644,348

[45] Date of Patent: * Feb. 17, 1987

[54] APPARATUS FOR PROVIDING MASTERLESS COLLISION DETECTION

[75] Inventor: Eugene P. Gerety, Wolcott, Conn.

[73] Assignee: ITT Corporation, New York, N.Y.

[*] Notice: The portion of the term of this patent subsequent to Jan. 20, 2004 has been disclaimed.

[21] Appl. No.: 670,682

[22] Filed: Nov. 13, 1984

[51] Int. Cl.⁴ .............................................. H04H 1/00
[52] U.S. Cl. ............................ 340/825.06; 340/825.5; 340/825.51; 370/85
[58] Field of Search ............... 364/200, 900, 138, 551; 370/85, 94, 108, 60, 95; 455/58; 361/392–395, 413; 340/825.5, 825.51, 825.06, 825.08, 825.02; 375/87, 110

[56] References Cited

U.S. PATENT DOCUMENTS

| | | | |
|---|---|---|---|
| 3,992,686 | 11/1976 | Canning | 361/413 |
| 3,993,936 | 11/1976 | Meade et al. | 361/413 |
| 4,281,380 | 7/1981 | De Mesa, III et al. | 370/94 X |
| 4,359,731 | 11/1982 | Beanford et al. | 340/825.51 |
| 4,376,278 | 3/1983 | Jacobsthal | 340/825.5 |
| 4,380,088 | 4/1983 | Lipcon | 370/94 X |
| 4,517,637 | 5/1985 | Cassell | 364/551 X |
| 4,535,448 | 8/1985 | Baxter et al. | 370/85 |

OTHER PUBLICATIONS

William H. Hayt, Jr., "Engineering Circuit Analysis", McGraw-Hill, New York, 1962, pp. 72–77.

*Primary Examiner*—Ulysses Weldon
*Attorney, Agent, or Firm*—Peter C. Van Der Sluys; Robert A. Hays

[57] ABSTRACT

An apparatus for providing masterless collision detection in a communication network includes a distinct data transmission bus and distinct collision detection reference bus. A voltage on the reference bus is monitored by each element to ascertain the existence of a change in the voltage which results in either the enabling or disabling of data transmission on the transmission bus by that element.

12 Claims, 4 Drawing Figures

APPARATUS FOR PROVIDING MASTERLESS COLLISION DETECTION

BACKGROUND OF THE INVENTION

The present invention generally relates to an apparatus for regulating the transmission of data within a data communication system and, in particular, relates to such an apparatus for the masterless control of data flow among a plurality of closely spaced peripheral interface devices each having a plurality of external peripherals interconnected thereto.

In modern communication networks a plurality of data transmit/receive elements, each capable of transmitting and receiving digital data signals, are interconnected via a common transmission medium for the exchange of data therebetween. Naturally, if more than one such element were to transmit data at the same time, excessive errors and data loss would occur and the network would be quite unacceptable. Hence, one major consideration in the design of such a communication network is the regulation, or allocation, of the transmission time among the elements in a fair and efficient manner so that the users connected thereto are not subjected to undue delays or other inconveniences when attempting to transmit information. This consideration persists regardless of the magnitude of the network designed, i.e., a long-haul network, a local area network, or a short-haul local area network.

At the present time and, as anticipated for years to come, one of the primary systems of interest for many users is a local area network or a short-haul local area network. Such a network is generally employed in a geographically concentrated facility, such as a university or business site, and includes a plurality of nodes each having a number of peripheral devices connect thereto. With the advances in semiconductor technology, the control of such nodes is presently available on a large-scale integrated circuit chip. These nodal chips can then be interconnected to provide communication services with other similar nodes to form a network. This design consideration can be characterized as the avoidance of collisions between two or more users attempting to simultaneously transmit information over a common transmission medium which interconnects a plurality of nodes.

One conventional solution to this congestion, or collision, problem is the use of a carrier signal that is transmitted to each node of the network and which is detected thereat.

The most common scheme is known as Carrier Sense Multiple Access with Collision Detection (CSMA/CD). In such a scheme, the phrase "carrier sense" means that any data transceiver client wishing to transmit, "listens" first. If the communication medium is being used by another subscriber, the client defers transmission. "Multiple access" indicates that any client wishing to transmit can do so without the need for a central controller. "Collision detection" refers to the fact that when the communication bus is idle any element can begin transmitting.

The CSMA/CD scheme is implemented such that during the transmission of data by any party this carrier signal is present. The presence of the carrier signal on the common communication medium serves to indicate to other nodes attempting to transmit that to do so would create a collision. Consequently, when the carrier signal is detected by any node attempting to transmit, that node is restrained from transmitting. This restraint is frequently implemented by requiring an enabling signal to be provided before actual data transmission occurs. Upon failure to receive such an enabling signal, due to the detection of a carrier, transmission is restrained.

The carrier signal, even for local area networks such as a large building, or a cluster of buildings, is most frequently transmitted to every node via a coaxial cable. Such a solution is quite expensive since the coaxial cable needs to be routed to each station along the network and requires expensive interface equipment.

From the above, it is apparent that schemes such as CSMA/CD for avoiding simultaneous transmission collisions become expensive due to the requirement of extra cable lengths and hard wire interconnections to service every node.

SUMMARY OF THE INVENTION

Accordingly, it is one object of the present invention to provide an apparatus for masterless collision detection in a communication network having a plurality of transmit/receive elements.

This object is accomplished, at least in part, by an apparatus having a common transmission bus and a common reference bus wherein each transmitting element, prior to transmission, establishes a voltage on the reference bus which voltage is monitored by all other elements connected thereto, and includes means for either enabling or disabling the transmission of data from an element depending on the voltage on the reference bus.

Other objects and advantages will become apparent to those skilled in the art from the following detailed description read in conjunction with the attached claims and the drawings appended hereto.

DETAILED DESCRIPTION OF THE INVENTION

Figure 1:
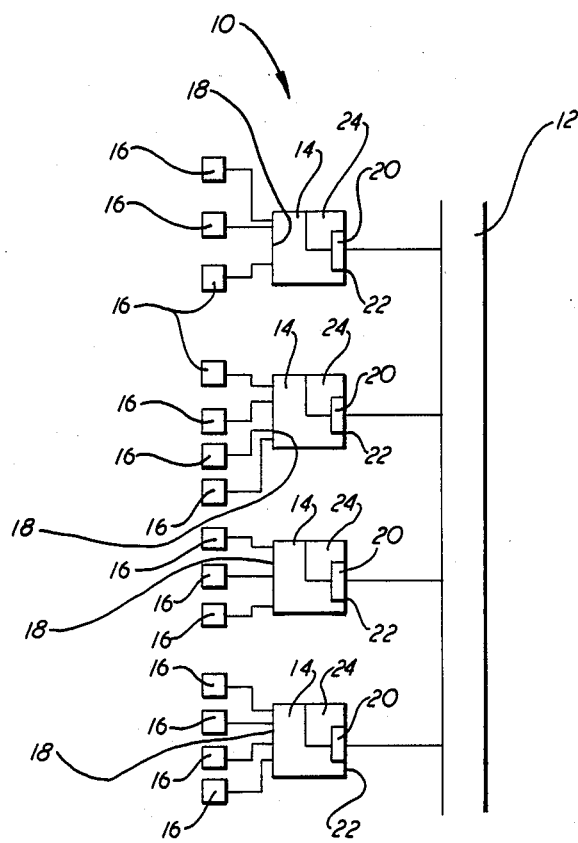
FIG. 1 is a block diagram of a data communication system having a plurality of elements capable of transmitting data onto a common transmission bus embodying the principles of the present invention.

A portion of a communications network, generally indicated at 10 in FIG. 1 and embodying the principles of the present invention, includes a communication bus 12 which sustains data signals and having interconnected thereto a plurality of nodes 14. Each node 14 can support a plurality of peripheral equipment items (hereinafter referred to as peripherals 16) on the peripheral side 18 thereof and a collision detection apparatus 20 on the communication bus side 22 thereof. As used herein, the term peripheral refers to any device or apparatus capable of delivering or receiving data including, but not limited to, a computer terminal or a communication system. In addition, each node 14 includes therein a traffic control means 24 which receives data from the peripherals 16 and regulates the transmission thereof onto the communication bus 12. Further, the traffic control means 24 also receives information from the communication bus 12 and, in conjunction with a local microprocessor, distributes it to the correct peripheral 16.

In the preferred embodiment, each node 14 includes at least one Very Large Scale Integrated (VLSI) circuit chip which provides the traffic controlling means 24 via a specific set of output connections. These output connections are conventional to such chips throughout the telecommunications industry.

Figure 2:
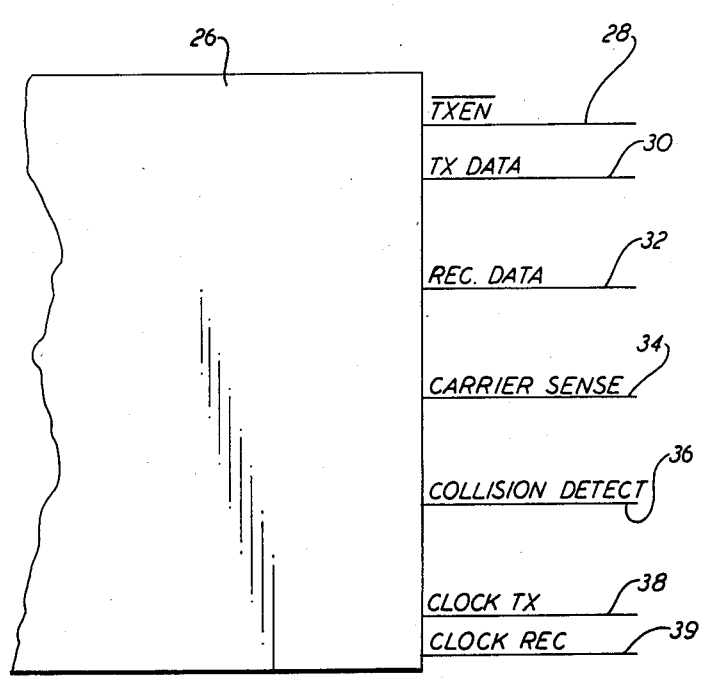
FIG. 2 is a block diagram of a traffic controller element useful in the present apparatus.

For example, as shown in FIG. 2, a typical VLSI nodal chip 26 includes a transmit enable port 28, a data transmission port 30, a data receive port 32, a carrier sense port 34, a collision detection port 36, and a transmit data clock port 38, and a receive data clock port 39 which clock ports, 38 and 39, are primarily employed to regulate the sequence and synchronization of transmitted and/or received data onto the communication bus 12.

In conventional systems, the carrier sense port 34 and the collision detect port 36 require an analog circuit detection means between the ports and the communication bus to convert the analog carrier signal to the digital inputs required at the ports of the VLSI chip. In addition, one industry standard, i.e. IEEE 802.3, requires the interconnecting cable to be a low noise, shielded 50 ohm coaxial cable no longer than about 500 meters in length per segment.

In one embodiment, the VLSI nodal chip 26 is, for example, either an Intel 82586, manufactured and marketed by Intel Corporation of Santa Clara, Calif., or an AMD 7990 manufactured and marketed by Advanced Micro Devices of Sunnyvale, Calif., although the functional equivalents thereof can also be used. Such a chip 26 is relatively well known in the industry and the outputs, or connections, thereto are substantially standardized. The major difference between the various known networks lies in the circuits and mechanism used to convert the analog carrier on the communication bus to the digital inputs required by the VLSI chip.

It has been recognized that many advantages are derived if each node 14 of a short-haul, local area network is closely spaced and capable of handling a number of peripherals 16 without direction from a central network controller, or the like. In this fashion, not only is the efficiency of the communications network 10 increased, but the reliability of data transmission escalates. For example, even if one or more individual elements fail, the overall network remains functional and substantially unaffected. In addition, because of the continued reduced costs for VLSI chips 26, it is a much less expensive undertaking to provide a plurality of nodes 14 to a more local group of peripherals 16 while maintaining sufficient capacity at each node 14 to expand.

By so grouping the nodes 14, it is now possible to provide a collision detection mechanism via a reference bus which is distinct from the data transmission bus. As further explained below, such a scheme additionally avoids the conventionally required implementation of signal bus detection systems.

Figure 3:
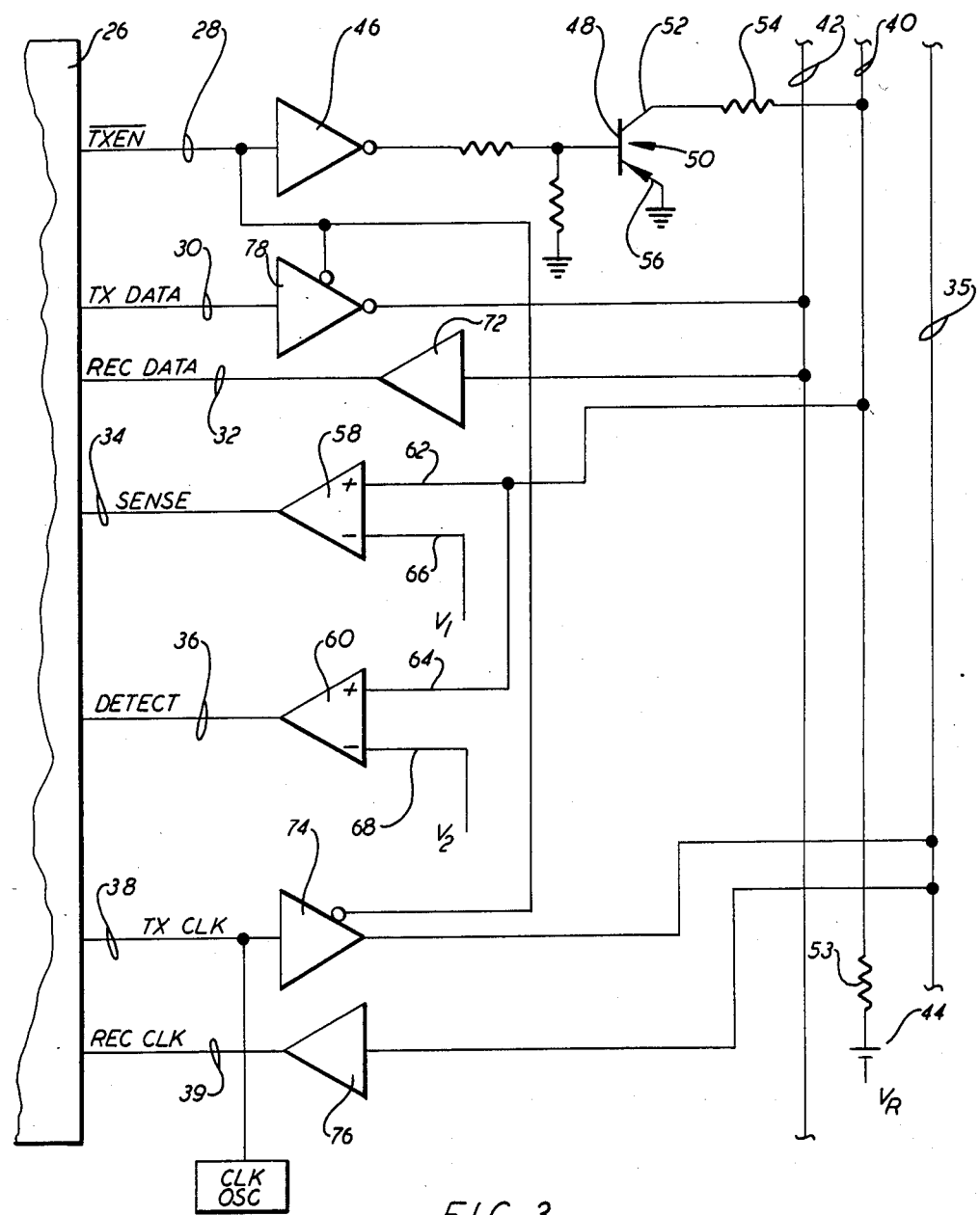
FIG. 3 is a detailed exemplary circuit of one particular embodiment of the present invention.

Referring now to FIG. 3, there is shown therein, a detailed schematic diagram of a preferred embodiment of the present invention having a collision detection reference bus 40 common to all nodes 14 and a distinct data transmission bus 42 also common to all nodes 14 and a distinct clock bus 35. Before proceeding with a detailed description of the FIG. 3, the interrelationship of the port functions of the controller chip 26 should be reviewed. For example, when the traffic controller chip 26 at a particular node 14 receives a signal from a peripheral 16 that data is to be transmitted, the transmission enable port 28 is gated to initiate a transmission request signal onto the collision detection reference bus 40. Simultaneously, the carrier sense line, communicating between the reference bus 40 and the sensing port 34 ascertains the activity on the collision detection reference bus 40. Such a sensing not only recognizes possible malfunctions of the system, but is employed to determine the existence of activity on the collision detection reference bus 40. A malfunction is quickly recognized if transmission were initiated and the carrier sense line does not detect any activity on the reference bus 40. The collision detect port 36, which is also connected to the collision detection reference bus 40, simultaneously ascertains the level of activity on the reference bus 40 and, if only a single node 14 is signalling to transmit, i.e., its own respective node 14, an enabling signal is passed, via the chip circuitry to allow transmission of data. However, should the level of activity exceed the activity of just a single node 14, then transmission enablement is refused and data is not transmitted onto the data transmission bus 42. Further, in the event that a collision is detected, the transmission request signal remains on the collision detection reference bus for a preselected time, which time may be programmable within the chip 26, to ensure that all transmitting nodes 14 detect the collision.

Such a sustained time is preferred to avoid collisions from transmitting nodes which may not have obtained the collision states in the bus 40 prior to the node request. For example, if one node queried the reference bus 40 at the same time as another node some finite length away, both nodes, but for the sustained transmission requests signals, could begin transmitting before sensing and detecting the presence of the other. This technique is commonly known in the art as jamming.

Upon refusal of an enablement signal to transmit, the controller mechanism within the chip 26 proceeds to calculate a random time delay before transmission is again attempted. For example, the time delay may include a random number generator which produces a binary number. The random number generated is, in one embodiment, multiplied by a number in a counter register which, for example, counts the number of attempts to transmit. Thus, the time difference between the refused attempt to transmit data and the subsequent attempt to transmit data is virtually guaranteed to be different for each node 14. Hence, identical continuous collisions between any two particular nodes 14 is avoided.

Figure 4:
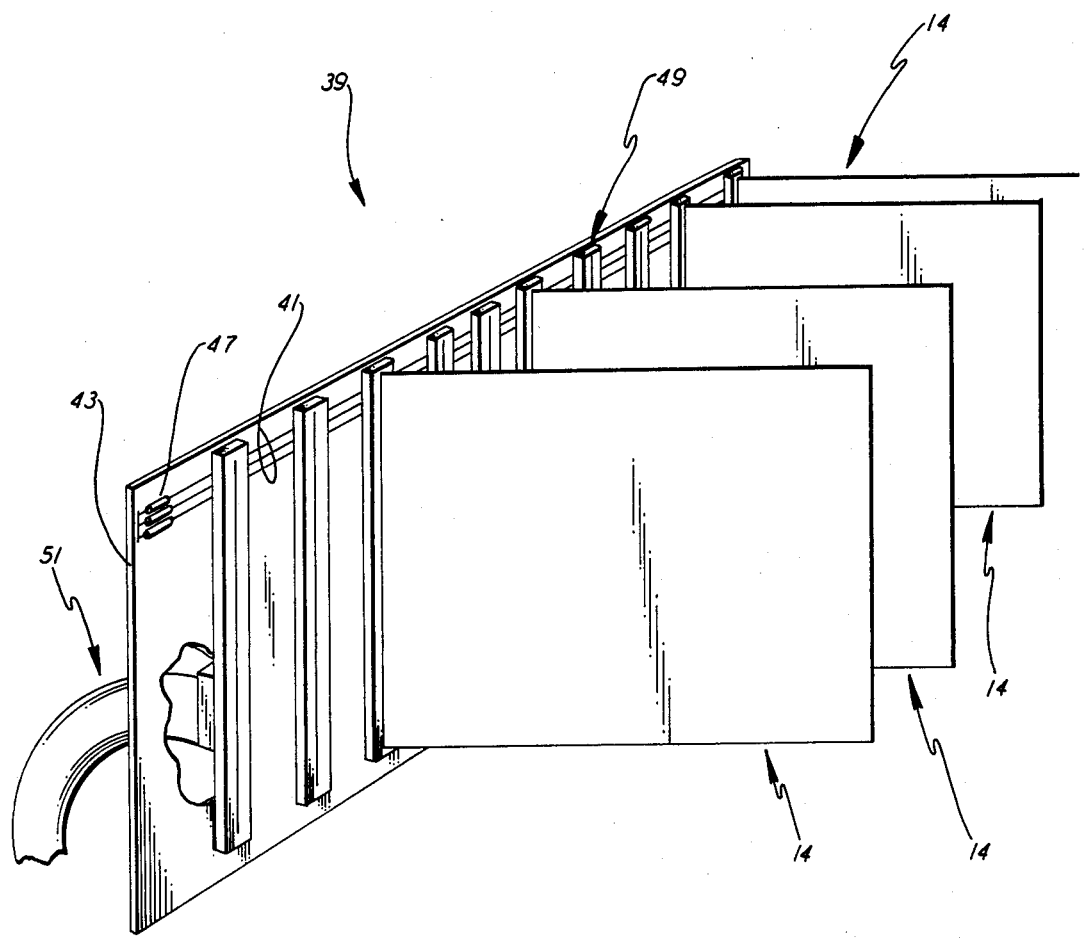
FIG. 4 is a perspective view of one embodiment of one hardware implementation of one embodiment of the present invention

In the preferred embodiment, the present invention is configured as a short haul local area network 39, and, as shown in FIG. 4, is compact as well as modularly expandable. In FIG. 4, a serial backplane 41 is formed on a mother board 43, or printed circuit board. The serial backplane 41 is, in this embodiment, three pairs of strips of copper constituting the collision detection reference bus 40, the data transmission bus 42 and the clock bus 35, respectively, and includes termination 47 therefor. The mother board 43 includes a plurality of printed circuit board connectors 49 attached thereto and interconnecting with the serial backplane 41. In this embodiment, the nodes 14 are represented as printed circuit boards. The short haul local area network 39 includes an external peripheral interconnection means 51, which, for example, may be a coaxial cable. If the short haul local area network 39 is to be interconnected with other similar networks, or to a larger system, another interconnection means, not shown in FIG. 4, i.e., boards, whether within the short haul local area network 39 or through a system, is regulated by the present apparatus 10.

Regardless of the specific implementation, the impedance of the collision detection reference bus 40 is known. In this embodiment, as shown in FIG. 3, a DC voltage source 44 is provided to establish a preselected DC voltage level on the collision detection reference bus 40. The DC voltage source 44 can either be associated with each node 14 or, alternatively, can be common to all nodes 14. In this example, the DC voltage source 44 is selected to establish an open circuit DC signal of 5 volts on the collision detection reference bus 40. Preferably, a precision resistor 53 is serially connected between the source 44 and the bus 40.

For clarity, only a single node 14 is shown in FIG. 3 thus each node has a separate one of the circuit arrangement described hereinafter associated therewith. The transmit enable port 28 is connected to the collision detection reference bus 40 by means of a inverter 46 which is connected to the base 48 of a transistor 50, the collector 52 of which is connected, via a resistor 54, to the bus 40. The emitter 56 of the transistor 50 is connected to a system ground. The carrier sense port 34 and collision detection port 36 are each connected to the collision detection reference bus 40 through voltage comparators, 58 and 60. Perferably, the voltage comparators, 58 and 60 have their high (or positive) sides, 62 and 64, respectively, common to each other and connected directly to the collision detection reference bus 40. In this embodiment, the voltage on the low, (or negative) side, 66 and 68, of each of the voltage comparators, 58 and 60, respectively, is pre-determined to indicate, with regard to the carrier sense port 34, the presence of a single enabled connection to the bus 40 and, with regard to the collision detection port 36, a threshold voltage indicating more than one connection.

In the preferred embodiment, the inverter 46 is a 74 LS04 logic inverter available from most semiconductor manufacturers. The transistor 50 is a 2N3904 and is also readily available from most semiconductor manufacturers. The voltage comparators, 58 and 60, are both LM339 types manufactured and marketed by National Semiconductor Inc. of Santa Clara, Calif.

In one mode of operation, the quiescent state of the transmit enable port 28 is in a binary one, or high, state. The inverter 46 translates this to a binary zero, or low, state. The binary zero, or low, state represents a voltage level which is predetermined to maintain the transistor 50 in a non-conducting condition. When the chip 26 receives data to transmit, the transmit enable port 28 changes from the binary high state to binary low, or zero, state. This zero binary state is converted to a binary high, or one, state by the inverter 46 which biases the base 48 of the transistor 50 whereby current is drawn thereacross. The drawing of current across the transistor 50 reduces the voltage level on the collision detection reference bus 40 from 5 volts to about 2.6 volts. Each enabled line of each node 14 further reduces the voltage level on the collision detection reference bus 40 by a predictable amount. Consequently, if two transmit enabled signals are present, the voltage on the collision detection reference bus 40 drops to about 1.8 volts. The carrier sense port 34 via the voltage comparator 58, which for the reference, in this embodiment the low side 66, has a voltage level of between the 2.6 volts and the 5 volts, i.e., roughly about 3.8 volts, ascertains the presence or absence of at least one party attempting to transmit on the collision detection reference bus 40. This additionally provides an indication of whether or not the attempt to transmit data is functioning.

If two nodes 14 are attempting to transmit simultaneously, the collision detection reference bus 40 has a voltage of approximately 1.8 volts. In this embodiment, the voltage level on the reference side 68 is preset to about 2.2 volts. Hence if the voltage on the collision detection reference bus 40 is less than 2.2 volts, the collision detect mechanism within the chip 26 does not transmit an enabling signal to the data transmission line. As a consequence, the traffic controller chip 26 defers to the internal arbitrary scheme thereof to determine when the next attempt to transmit information is made.

As shown, the transmit port 30 communicates with the data transmission bus 42 via a tri-state differential driver 78 whereas the receive port 32 communicates with the bus 42 via a differential receiver 72. Similarly, the transmit clock port 38 and the receive clock port 39 communicate with the clock bus 35 via a tri-state differential driver 74 and a differential receiver 76, respectively.

The drivers, 78 and 74, and receivers, 72 and 76, are devices well known in the art and further detailed discussion thereof is deemed unnecessary for a complete understanding of the present invention. One such circuit driver 74 is the DS3691 and a compatible receiver 76 is the DS3486 both manufactured and marketed by National Semiconductor, Corporation of Santa Clara, Calif.

In one implementation of the present invention a number of controller chips 26 are in relative proximity to each other and, consequently, noise factors and/or interference have negligible effect on the voltage levels at the voltage comparators, 58 and 60. However, should the present collision detection apparatus 20 be employed between widely separated nodes, then the voltage levels placed on the collision detection reference bus 40 would have to be amplified, or repeated, to provide the appropriate signals at the more distant nodes.

Although the present invention has been described herein with respect to a specific exemplary embodiment, other arrangements and configurations may be possible without departing from the spirit and scope of the invention. Consequently, the present invention is deemed limited only by the attached claims and the reasonable interpretation thereof.

What is claimed is:

1. An apparatus for providing masterless collision detection in a communication network having a plurality of elements capable of transmitting data; said apparatus comprising:

a data transmission bus common to said plurality of elements;

a collision detection reference bus common to said plurality of elements, said collision detection reference bus being distinct from said data transmission bus;

means, for establishing a voltage level on said collision detection reference bus;

means, associated with each said element, for changing said voltage level on said collision detection reference bus;

means, associated with each said element, for monitoring the voltage on said collision detection reference bus said monitoring means providing a signal indicative of said voltage, said voltage monitoring means including a comparator having one input thereto connected to said collision detection reference bus and the other input connected to a preselected reference, said comparator generating a signal only when at least two of said voltage level changing means are operative; and means, associated with each transmission element, and responsive to said signal, for providing a signal useful for controlling the injection of data onto said data transmission bus.

2. Apparatus as claimed in claim 1 wherein said voltage establishing means includes a DC voltage source.

3. Apparatus as claimed in claim 2 wherein said voltage establishing means further includes a resistor serially connected between said DC voltage source and said collision detection reference bus.

4. Apparatus as claimed in claim 2 wherein said collision detection reference bus has a known stable impedance.

5. Apparatus as claimed in claim 1 wherein said voltage changing means includes a transistor connected to said collision detection reference bus, said transistor being adapted to conduct in response to a logic level.

6. Apparatus as claimed in claim 5 further comprising a fixed impedance between said transistor and said collision detection reference bus.

7. Apparatus as claimed in claim 1 wherein said voltage monitoring means includes a second voltage comparator having one input thereto connected to said collision detection reference bus and the other input connected to a preselected voltage reference said second comparator generating a signal only when at least one of said voltage changing means is operative.

8. Apparatus as claimed in claim 1 further comprising a plurality of nodal traffic control chips; each said chip being associated with one of said elements, each said chip having a first port communicating with said voltage changing means, a second port communicating with said voltage monitoring means and a third port communicating with said signal providing means.

9. Apparatus as claimed in claim 8 wherein the output of said first port is binary.

10. Apparatus as claimed in claim 8 wherein said voltage changing means is responsive to a binary output change at said first port.

11. A short haul local area network comprising:

a printed circuit board having a data transmission bus and a separate collision detection reference bus formed thereon;

a plurality of printed circuit board receptacles affixed to said printed circuit board, each receptacle being serially interconnected to said data transmission bus and said collision detection reference bus;

a plurality of nodal printed circuit boards interconnected to said data transmission bus and said collision detection reference bus via said receptacles, each said nodal printed circuit board having a nodal traffic control chip associated therewith; and means between each said nodal chip and said data transmission and reference busses, for providing masterless multiple access with collision detection service to said short haul local area network said providing means includes means, for establishing a voltage on said collision detection reference bus; means, associated with each said element, for changing said voltage on said collision detection reference bus, means, associated with each said element, for monitoring the voltage on said collision detection reference bus, said monitoring means providing a signal indicative of said voltage and including a comparator having one input thereto connected to said collision detection reference bus and the other input connected to a preselected reference, said comparator generating a signal only when at least two of said voltage level changing means are operative; and means, associated with each element and responsive to said signal, for providing a signal useful for controlling the injection of data on said data transmission bus.

12. Apparatus as claimed in claim 11 wherein said voltage monitoring means includes a second voltage comparator having one input thereto connected to said collision detection reference bus and the other input connected to a preselected voltage reference said second comparator generating a signal only when at least one of said voltage changing means is operative.

* * * * *